UNITED STATES PATENT OFFICE 2,315,195

INDIGOID DYESTUFFS AND PROCESS OF MAKING SAME

Jaroslav Froehlich, Basel, Ernst Stoecklin, Binningen, and Richard Tobler, Riehen, Switzerland, assignors to Society of Chemical Industry in Basle, Basel, Switzerland No Drawing. Application April 27, 1940, Serial No. 332,100. In Switzerland May 13, 1939

9 Claims. (Cl. 260—322)

The present invention is concerned with new and valuable indigoid vat dyestuffs, as well as with a process for their preparation. It is more particularly concerned with a group of new indigoid dyestuffs of the indirubin type (2:3'-indigoid dyestuffs).

While chemical technique, since the elucidation of the constitution of indigo, and since the discovery of serviceable syntheses, has produced an extraordinary number of good dyestuffs of the 2:2'-indigoid type

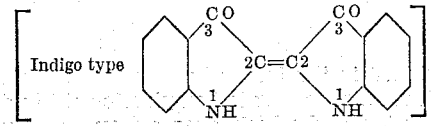

during the same period only comparatively few indigoid dyestuffs of the 2:3'-indigoid type

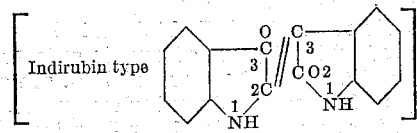

have been prepared. Whilst an important number of 2:2'-indigoid dyestuffs are abundantly used in practice, the 2:3'-indigoid dyestuffs, if they have ever been met with in the trade at all, have now practically disappeared from use on account of the extremely high fastness demands made by the users. As in the case of their parent substances (indirubin being unserviceable for dyeing purposes, whilst indigo is still used even to-day) dyestuffs of the indirubin type generally possess markedly poorer fastness properties than dyestuffs of the indigo type.

It has now been found that the present group of new indigoid dyestuffs of the indirubin type possess surprisingly good properties, and moreover that they are, in particular, excellently suited for printing purposes. In this way, dyestuffs will be introduced to the trade which possess new and valuable shades which either are unobtainable by the use of the known vat dyestuffs or are obtained only by means of mixtures which can be very difficult to control.

The dyestuffs of the present invention are obtained when 6-halogen-7-methylisatins are condensed with 2:1-naphththioindoxyls to form compounds of the indirubin type. As 6-halogen-7-methylisatins which may come into consideration as parent substances for the present process are, for example, 6-chloro- or 6-bromo-7-methylisatin. The 2:1-naphththioindoxyls which may be used in the preparation of the indirubin-like dyestuffs may carry substituents in the most varied positions. As examples may be named 2:1-naphththioindoxyl, also 5-chloro-2:1-naphththioindoxyl, 5-chloro-6-methoxy-2:1-naphththioindoxyl, as well as their corresponding products in which chlorine is replaced by bromine.

The condensation may be carried out according to known methods, for example, in the presence of organic solvents such as alcohol, glacial acetic acid, benzene, or chlorobenzene. In many cases the condensation in sulphuric acid yields particularly good results in regard to the yield and the purity of the product.

The dyestuffs obtained according to the present process are notable for their remarkably good fastness properties, for example, for their fastness to light, chlorine and washing. The dyestuffs are suitable for the dyeing and also particularly the printing of the most varied materials, for example, cellulosic fibers, such as cotton and regenerated cellulose rayons, and also fibers of animal origin. They can also be utilized in the form of their leuco sulphuric acid ester salts, which may be prepared in the usual manner.

Example 1

195.5 parts of 6-chloro-7-methylisatin and 264.5 parts of 5-chloro-6-methoxy-2:1-naphththioindoxyl are heated in 6000 parts of glacial acetic acid until condensation is complete. The reaction mixture is then filtered and the product is washed with glacial acetic acid and alcohol and dried. The dyestuff obtained of the formula

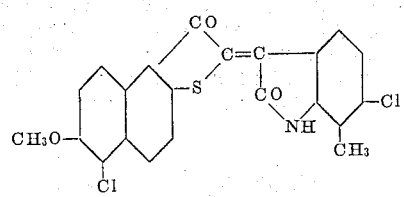

is a brown powder which is soluble to a violet solution in concentrated sulphuric acid and which dyes cotton in clear brown shades from a yellow-brown dyevat.

If the corresponding quantity of 6-bromo-7-methylisatin be used in place of the 6-chloro-7-methylisatin, a very similar dyestuff is obtained.

Example 2

195.5 parts of 6-chloro-7-methylisatin and 200 parts of 2:1-naphththioindoxyl are stirred in 15,000 parts of sulphuric acid of 94% strength at 10–15° C. until condensation is complete. The reaction mixture is poured into ice water, filtered, washed until free from acid and dried. The dyestuff obtained of the formula

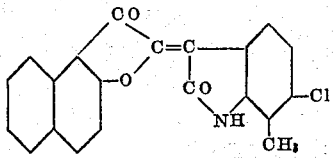

is a brown powder which dissolves in concentrated sulphuric acid to a blue solution and dyes cotton in clear, red-brown shades from a yellow-brown dyevat.

The same dyestuff is formed if 195.5 parts of 6-chloro-7-methylisatin and 200 parts of 2:1-naphththioindoxyl are heated for 72 hours with 20,000 parts of alcohol under reflux.

By printing on cotton or viscose rayon, clear red-brown shades are also produced.

*Example 3*

195.5 parts of 6-chloro-7-methylisatin and 279 parts of 5-bromo-2:1-naphththioindoxyl are stirred in 15,000 parts of sulphuric acid of 94% strength at 10–15° C. until the condensation is completed. The reaction product is poured into ice water, the suspension is filtered and the residue is washed until free from acid and then dried. The dyestuff obtained of the formula

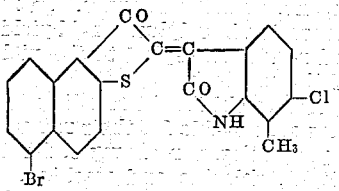

is a red-brown powder which dissolves in concentrated sulphuric acid with formation of a violet solution and which dyes cotton in very fast clear red-brown shades from an orange coloured dyevat.

If the corresponding quantity of 6-bromo-7-methylisatin be used in place of 6-chloro-7-methylisatin, a very similar dyestuff is obtained. This is also the case when 5-chloro-2:1-naphththioindoxyl be used in place of the 5-bromo-2:1-naphththioindoxyl.

*Example 4*

195.5 parts of 6-chloro-7-methylisatin and 309 parts of 5-bromo-6-methoxy-2:1-naphththioindoxyl are stirred in 15,000 parts of sulphuric acid of 94% strength at 10–15° C. until the condensation is complete. The reaction product is then run into ice water, the suspension is filtered and the residue is washed until free from acid and is then dried. The dyestuff of the formula

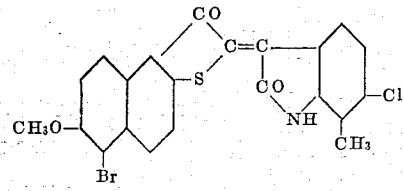

is obtained in the form of a brown powder which dissolves in concentrated sulphuric acid to a violet solution and which dyes cotton in very fast, clear brown shades from a reddish-yellow dyevat.

*Example 5*

195.5 parts of 6-chloro-7-methylisatin and 230 parts of 6-methoxy-2:1-naphththioindoxyl are stirred in 12,000 parts of sulphuric acid of 94% strength at 10–15° C. until condensation is complete. The reaction mass is then poured into ice water, the suspension formed is filtered and the residue is washed until free from acid and dried. The dyestuff of the formula

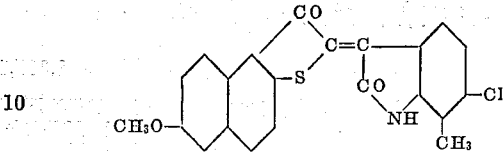

is obtained in the form of a brown powder which dissolves in concentrated sulphuric acid to give a violet solution and which dyes cotton in yellow-brown shades from a reddish-yellow dyevat.

*Example 6*

195.5 parts of 6-chloro-7-methylisatin and 234.5 parts of 7-chloro-2:1-naphththioindoxyl are stirred in 15,000 parts of sulphuric acid of 94% strength at 10–15° C. until the condensation is complete, after which the reaction mass is poured into ice water, the suspension is filtered and the residue is washed until acid free and dried. The dyestuff of the formula

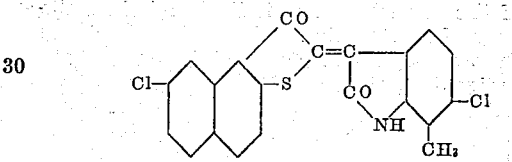

is obtained in the form of a brown powder which dissolves in concentrated sulphuric acid to a violet solution and which dyes cotton in very fast red-brown shades from a yellow dyevat.

*Example 7*

1.5 parts of the dyestuff obtained in Example 2 are pasted with 20 parts of caustic soda at 33% strength, 750 parts of water at 70° C. are added and then 15 parts of sodium hydrosulphite. The mixture is allowed to stand for 30 minutes and is then diluted to 2000 parts with water. 100 parts of cotton are entered at 60° C., and, after 10 minutes, 50 parts of common salt are added and dyeing is continued for a further ½ hour at 60° C. The cotton is then withdrawn, oxidized in the air, rinsed and soaped. It is now dyed in a beautiful clear shade of red-brown, which is very fast.

For wool, silk and rayon, the dyeing process must naturally be altered accordingly. This is also the case in printing.

What we claim is:

1. Process for the manufacture of indigoid dyestuffs, comprising condensing 2:1-naphththioindoxyls with 6-chloro-7-methylisatin in sulphuric acid as diluent, to 4:5-benzo-2-thionaphthene-3'-indole-6'-chloro-7'-methylindigoes.

2. Process for the manufacture of indigoid dyestuffs, comprising condensing 5-chloro-6-methoxy-2:1-naphththioindoxyl with 6-chloro-7-methylisatin in sulphuric acid as diluent to bz 3-methoxy - bz 4-chloro - 4:5 - benzo-2-thionaphthene-3'-indole-6'-chloro-7'-methylindigo.

3. The products of the general formula

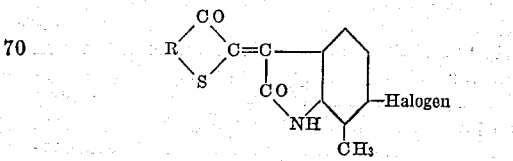

wherein R is a naphthalene radical united to the

—CO— in the 1-position and to the —S— in the 2-position.

4. The products of the general formula

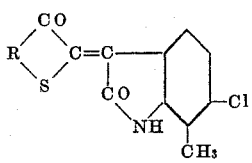

wherein R is a naphthalene radical united to the —CO— in the 1-position and to the —S— in the 2-position.

5. The products of the general formula

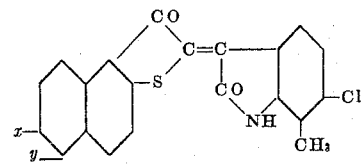

wherein $x$ stands for halogen and $y$ for a member of the group consisting of hydrogen and $OCH_3$.

6. The products of the general formula

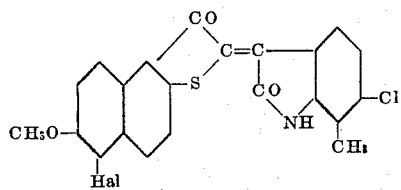

7. The product of the formula

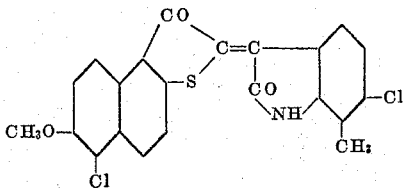

8. The product of the formula

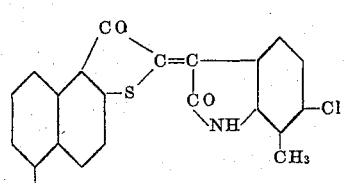

9. The product of the formula

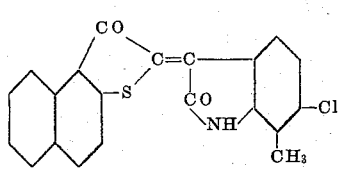

JAROSLAV FROEHLICH.
ERNST STOECKLIN.
RICHARD TOBLER.